G. W. EDDY.
Car Wheel.
No. 6,999.
Patented Jan. 8, 1850.
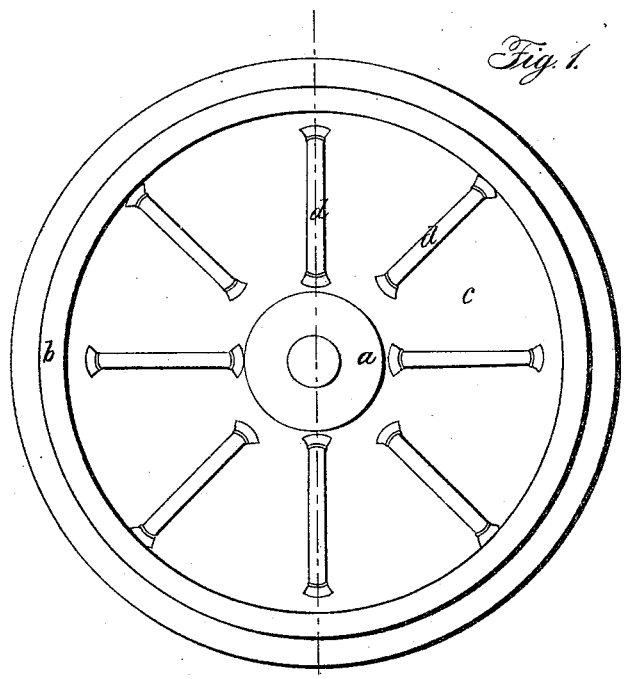
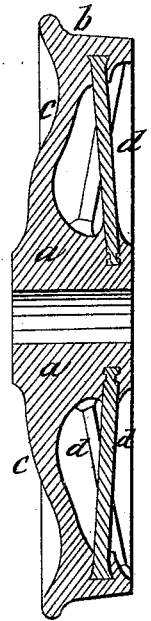
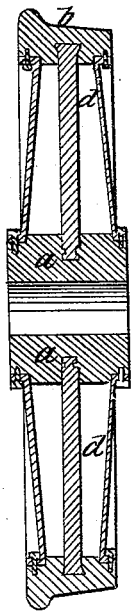
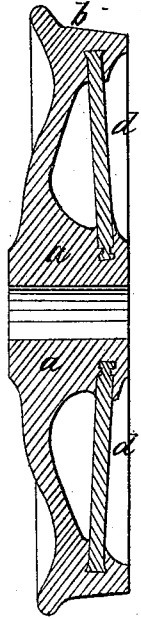

UNITED STATES PATENT OFFICE.

GEO. W. EDDY, OF WATERFORD, NEW YORK.

CAR-WHEEL.

Specification of Letters Patent No. 6,999, dated January 8, 1850.

*To all whom it may concern:*

Be it known that I, GEO. W. EDDY, of Waterford, in the county of Saratoga and State of New York, have invented a new and Improved Railroad-Car Wheel, and that the following is a full, clear, and exact description of the principle or character which distinguishes it from all other things before known and of the manner of making, constructing, and using the same, reference being had to the accompanying drawings, making part of this specification, in which—

Figure 1 is an elevation of the outside face of the wheel, and Fig. 2 a vertical section thereof in the plane of the axle, Figs. 3, 4, 5 are sectional representations of modifications of my improvement.

The principle or character of my invention which distinguishes it from all other things before known consists in combining with a cast iron solid hub and chilled cast iron rim, connected by a plate or plates either cast in one substance, with the hub and rim or otherwise secured thereto, a set or sets of metal bars or spokes, secured in place either by casting the hub and rim thereon or otherwise secured to them, for the purpose of giving additional strength to the wheel and preventing the hub from separating from the rim when the plate or plates break and thereby avoiding many of the disasters so frequent on railroads.

In Figs. 1 and 2 of the accompanying drawings (*a*) represents the solid cast iron hub, and (*b*) the chilled rim of the usual form of railroad wheels. These are connected together in the casting by a bent or dished plate or disk (*c*), which is curved outward to yield or bend to the unequal contraction in cooling. In molding the wheel, round rods of iron (*d*,) are inserted so that the metal of the hub will be cast onto their inner ends, and the metal of the rim onto their outer ends. And they are arranged in two sets, one set running outward from the rim toward one end of the hub and the other set in the opposite direction toward the other end of the hub, so as to brace the hub in opposite directions, but the two sets are placed within the plate, that is between the plate and the edge of the rim and end of the hub opposite to the plate. Before the rods are inserted in the mold the ends are either upset or notched or grooved so that the cast metal of the hub and rim shall close around the projections or within the notches or recesses to hold the whole together securely. Care however should be taken not to have the rods so long as that the ends shall approach too near either to the tread of the rim or the bore of the hub. The metal of the hub and rim should be swelled out, or enlarged around the junctions of the rods to give greater strength to the connection.

Instead of the two sets of rods as described and represented in Figs. 1, and 2, but one set may be used as shown in Fig. 3, and these may be placed so as to incline outward from the rim toward the hub, or they may be placed at right angles to the axis, or inclined in any desired and appropriate direction although I prefer to give them the inclination represented in Fig. 3. And so of the plate or disk, instead of one plate two may be used inclosing the rods in the space between the plates as shown in Fig. 4, and these plates may be curved in any manner desired which will admit of their yielding to the unequal contraction in cooling or the plate or plates instead of being cast whole may be made open that is with sections left out, the remaining sections having the appearance of spokes or arms of any desired curve. And instead of casting the hub and rim in one substance with the plate or plates, the hub and rim may be cast into the ends of the rods, and then one or two plates put in and secured to the hub and rim by screw bolts or otherwise, as shown in Fig. 5. Or the hub and rim may be cast with the plate or plates and then the rods inserted. Or the hub and rim may be cast separately and then connected by means of the rods and plate or plates by any of the known means of securing together such parts. The rods may be made of any kind of metal and of any form desired.

I have thus pointed out the various modification of which my invention is susceptible, although I prefer to make my improved wheel in the form and manner first described and represented in Figs. 1 and 2 of the accompanying drawings.

By the combination of the rods and the plate or plates for connecting the rim and hub, it will be seen that should the plate or plates break in running the rods will continue to hold the hub and rim together and thus prevent any injury to the train, while at the same time the rods will have the effect in a great measure to prevent the breaking of the plates in running.

The spokes may be made hollow of any desired shape, or composed of round tubes.

What I claim as my invention and desire to secure by Letters Patent in railroad car wheels is—

The combination of the rods which connect the hub and rim with the plate or plates which also unite the hub and rim, substantially as herein described, whereby the plate or plates are protected against fracture from any sudden jar, and the hub prevented from being separated from the rim should the plate or plates break, as herein described.

GEORGE W. EDDY.

Witnesses:
A. P. BROWNE,
A. E. PETERS.